United States Patent [19]
Guevara et al.

[11] Patent Number: 4,895,485
[45] Date of Patent: Jan. 23, 1990

[54] LOCKING KEY FOR THREADED INSERT

[75] Inventors: Belen A. Guevara, Escondido; Robin W. Elcock, Torrance, both of Calif.

[73] Assignee: Rexnord Holdings Inc., Torrance, Calif.

[21] Appl. No.: 253,998

[22] Filed: Oct. 5, 1988

[51] Int. Cl.⁴ .............................................. F16B 39/06
[52] U.S. Cl. ................................. 411/322; 411/110; 411/292; 411/939; 411/944
[58] Field of Search ............... 411/110, 140, 178, 292, 411/293, 321, 322, 514, 939, 944, 948, 323

[56] References Cited

U.S. PATENT DOCUMENTS

| | | | |
|---|---|---|---|
| 546,173 | 9/1895 | Martin | 411/292 |
| 1,416,700 | 5/1922 | Fenicle | 411/514 X |
| 3,270,792 | 9/1966 | Neuschotz et al. | 411/110 |
| 3,319,688 | 5/1967 | Rosán et al. | 411/110 |
| 3,447,356 | 6/1969 | Neuschotz | 72/377 |
| 3,537,118 | 11/1970 | Neuschotz | 411/939 X |
| 3,667,526 | 6/1972 | Neuschotz | 411/110 |
| 4,767,249 | 8/1988 | Elcock et al. | 411/110 |

FOREIGN PATENT DOCUMENTS 22976 12/1900 United Kingdom ............... 411/292

Primary Examiner—Gary L. Smith
Assistant Examiner—F. Saether
Attorney, Agent, or Firm—Pretty, Schroeder, Brueggemann & Clark

[57] ABSTRACT

A key for locking a threaded insert in a carrier material is provided with an improved tang portion. The improved tang portion includes spring retention means for reducing the friction required to position and hold the key within an insert slot prior to final installation and provide superior driveability over known prior art keys. The spring retention means includes a flexure area and a pair of protrusions which are held by spring force against the walls of the insert slot. The flexure area is centrally located on the tang portion and includes an aperture therein.

11 Claims, 2 Drawing Sheets

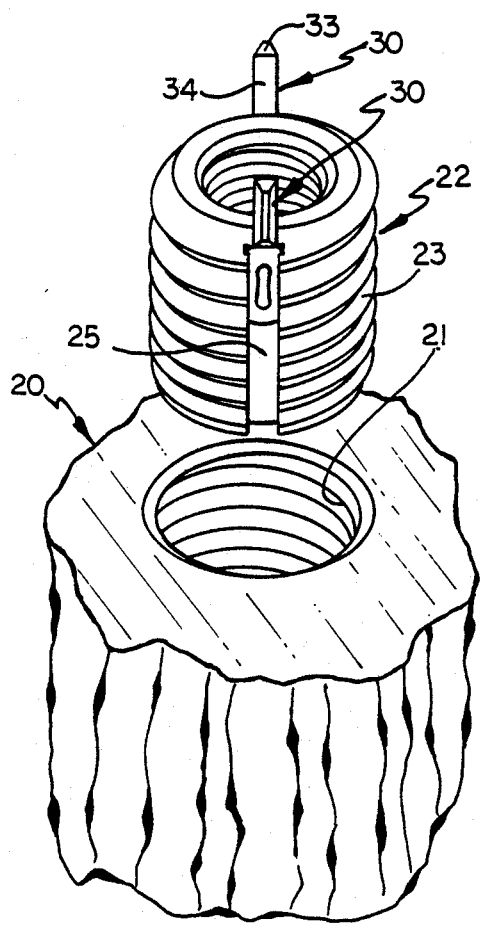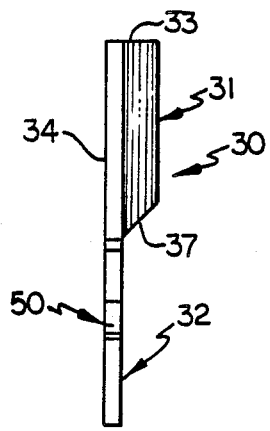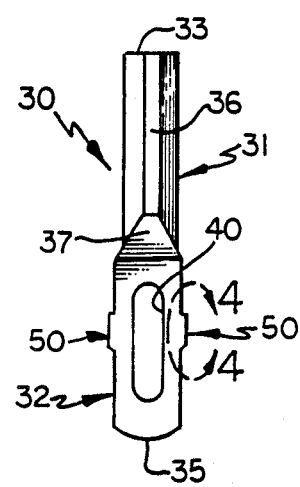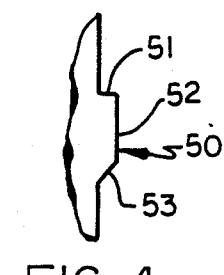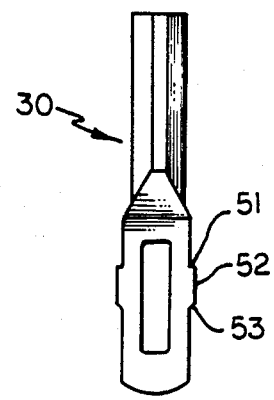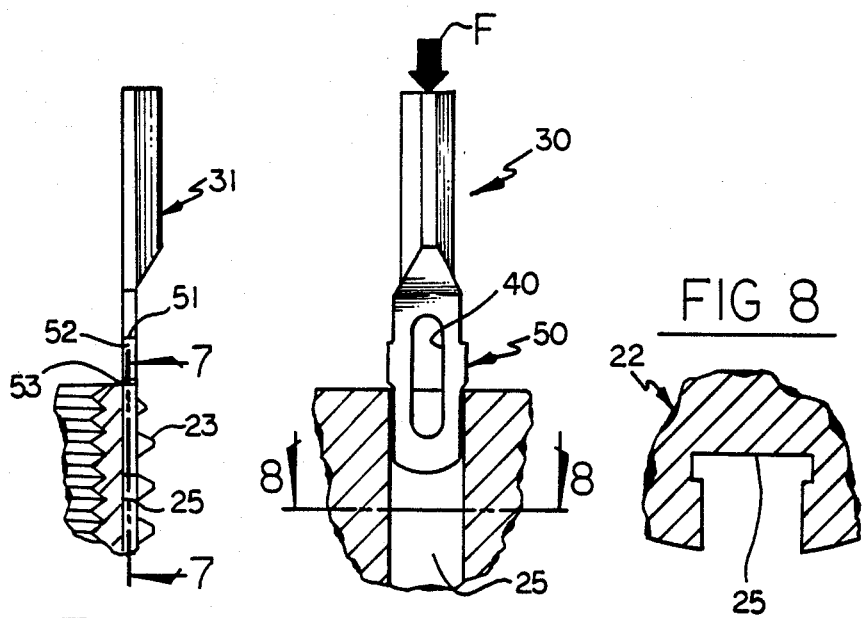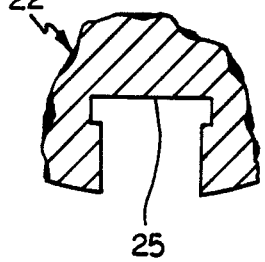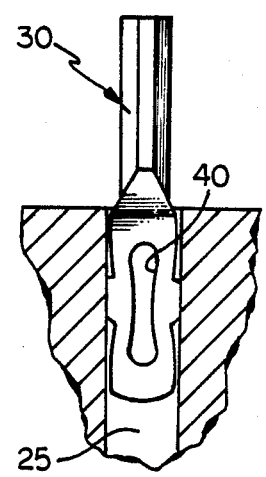

LOCKING KEY FOR THREADED INSERT

TECHNICAL FIELD

The present invention relates to keys which are used to lock an insert into a carrier material. In particular the present invention relates to the tang portion of such keys which initially retains the key in the insert prior to final installation therein.

BACKGROUND

An early example of a prior art locking key may be found in U.S. Pat. No. 3,270,792, issued Sept. 6, 1966 to Neuschotz et al. The initial mounting or tang portion of the Neuschotz locking key embodies a complete interference fit for retaining the key in a slot of the insert prior to installation. Recurring problems with this type of tang portion configuration include increased driving forces being required in order to install a key having an excessive interference fit due to poor quality manufacturing of either the key or the insert slot. Oftentimes such problems require costly reworking of the slot to correct such problems. Such reworking may be prohibitive because of either the added cost or time to accomplish such.

Subsequent to the '702 patent, improvements in the tang portion configuration were attempted in order to overcome the problems of the complete interference fit. U.S. Pat. No. 3,447,356 issued June 3, 1969 and U.S. Pat. No. 3,537,118 issued Nov. 3, 1970 to Neuschotz are illustrative of such attempts. In the '356 patent the tang portion of the locking key is shown with a configuration which reduces the amount of surface area providing the necessary interference fit. The '118 patent shows a related attempt to accomplish the same result. Unfortunately those attempts and other prior art efforts did not and have not eliminated the driveability problems associated with the original interference fit tang portions. And even when such problems were overcome, other problems would typically arise such as obstructions, e.g. burrs, in the insert slot which in and of themselves would prevent the proper installation of the locking key relative to the slot. This in turn would prevent the key from being completely driven into the carrier material.

Despite the presence of problems, inserts with locking keys continue to enjoy a market demand. Satisfying such demand with a quality, reliable product has led to the development of the present invention. The present invention is an improved tang configuration for the locking key which will overcome many, if not all, of the recurring problems of the conventional prior art interference fit designs.

SUMMARY

The present invention is an insert locking key having an improved tang portion configuration. Specifically the improved configuration has a spring retention mechanism which reliably holds the key in the insert slot and yields improved driveability of the key in comparison to known prior art. The spring retention mechanism includes a flexure area in the tang portion and outwardly extending protrusions located on either side of the flexure area. The flexure area is defined by an opening or aperture extending through the tang portion. The aperture is preferably rectangular in shape and centrally located in the tang portion. The protrusions are preferably centrally positioned on either side of the flexure area and each protrusion includes a leading surface area for guiding the key into the slot to its initial mounting position within the insert.

These features and the advantages obtained therefrom will be explained in greater detail in the description which follows.

BRIEF DESCRIPTION OF THE DRAWINGS

FIG. 1 is an exploded view in perspective of a preferred embodiment of the present invention, an insert, and carrier material.

FIG. 2 is a side view of a preferred embodiment for the locking key of the present invention.

FIG. 3 is a front plan view of the locking key shown in FIGS. 1 and 3.

FIG. 4 is an enlarged plan view of a portion of the locking key shown in FIG. 3.

FIG. 5 is a front plan view of an alternate configuration for the tang portion of the locking key of the present invention.

FIG. 6 is a side view in cross-section of the locking key of the present view as shown partially installed in an insert.

FIG. 7 is a cross-sectional view of the locking key and insert and seen generally along lines 7—7 in FIG. 6.

FIG. 8 is a cross-sectional view of a key slot as seen generally along lines 8—8 in FIG. 7.

FIG. 9 is a front plan view of the locking key as initially retained in an insert shown in cross-section.

DETAILED DESCRIPTION OF A PREFERRED EMBODIMENT

Figure 10:
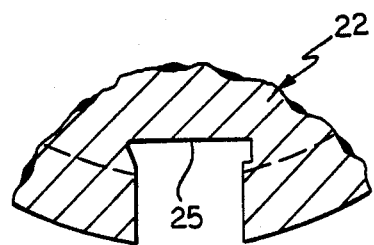
FIG. 10 is a cross-sectional view of a defective key slot.

FIG. 1 illustrates a typical application for use of the present invention. A carrier material 20 is shown in which a threaded passage or opening 21 is provided. The carrier material is representative of items such as an aircraft panel or a computer housing. An insert 22 representing one component of a more elaborate fastener assembly is shown positioned as it would appear just prior to being threaded into the carrier opening 21 for installation therein. The insert 22 includes external or outer threads 23 which are compatible with the threads of the carrier opening 21. Depending upon the size of the insert, two or more key slots 25 are provided which extend longitudinally through the external threads 23. Initially or prior to final installation of the insert, only the tang portion of a locking key 30 is retained in the key slot 25 as shown in FIG. 1.

FIGS. 2-4 provide an understanding of a preferred embodiment for the locking key of the present invention. The key 30 has an upper or locking portion 31 and a lower or tang portion 32. The two portions 31, 32 are formed continuous with each other. For reference purposes only the key 30 will be referred to as having a top surface 33, a substantially flat or planar back surface 34, and a bottom surface 35. The flat or planar back surface 34 is typically constructed so as to permit a sliding displacement of the key 30 along the key slot 25 as the key is installed therein. The top surface 33 is generally flat in order to provide a driving surface for the installation tool and to provide a flush surface area with the carrier material after the key is finally and properly installed in its locking position (not shown). The bottom surface 35 forms the termination of the tang portion 32 and may be curvilinear as shown for the preferred embodiment.

The upper locking portion 31 has a substantially triangular cross-section and is essentially the original form of the wire before the key is manufactured. The apex of the locking key portion is represented by the reference numeral 36. The cutting surface 37 of the key may have a variety of configurations commonly known in the prior art. Shown in the drawings for the preferred embodiment is a commonly used flat, angular surface 37 which is suitable for cutting through the threads of the carrier opening 21 in order to lock the insert into the opening 21.

Turning now specifically to the tang portion 32 of the insert, the preferred embodiment for the present invention will be described. The tang portion 32 has a substantially rectangular cross-section except for a centrally located area. It is this centrally located area where the present invention is constructed. To temporarily maintain the key in the insert slot during shipment and handling of the insert, the tang portion must be carefully constructed to permit the necessary frictional engagement with the walls of the key slots 25, without restricting the final installation of the key for the purpose of locking the insert within the carrier material. The present invention accomplishes this requirement in the following manner.

An aperture or through-opening 40 is provided in the tang portion to create a flexure area along the tang portion. In the preferred embodiment the aperture 40 is selected to extend longitudinally through the tang portion 32. The shorter or closed ends of the aperture may be curvilinear as shown in FIGS. 2-3, or the opening may be rectangular as shown in FIG. 5. The portions of the tang portion 32 which extend along either side of the opening or aperture 40 take on the characteristics of a spring mechanism as the aperture permits these portions to flex inward of the opening if necessary. Located centrally on either outside edge of the flexure area is a pair of protrusions 50. Preferably each protrusion 50 has a flat upper surface 51, a flat side surface 52, and an angled, leading or ramp surface 53. The side surfaces 52 directly contact the walls of the slot in order to hold the key under reduced friction in a parallel orientation with the key slot 25. In combination with the flexure area formed by the opening 40, the protrusions 50 provide a spring retention mechanism for the key. This is a unique feature not found in any of the known prior art, and it functions as follows.

As shown in FIGS. 6 and 7 the locking key 30 is positioned directly above the insert slot 25 and is not yet retained in the insert. However, by exerting sufficient pressure downward upon the key, as indicated by the arrow F, the leading surfaces 53 of the protrusions 50 provide a ramping effect for the tang portion and the tang portion immediately adjacent to the protrusions may flex inwardly to permit the key to move into the insert slot. When the tang portion reaches its initial mounting position as shown in FIG. 9, the flexure area of the tang portion exerts a spring force upon the protrusions 50 in contact with the walls of the slot 25. The combined spring force and minimal surface area contacting the walls of the slot 25 result in a reliable retention of the key within the slot prior to installation. Because the key is retained by spring pressure as opposed to an interference fit, the amount of force required to drive the key to its final installation position is reduced in comparison to known prior art keys. This reduction in force helps insure that the key will penetrate the carrier material before the body of the key collapses due to column failure, a not uncommon problem with prior art keys.

Further, there is increased reliability over prior art designs because the present invention provides a flexibility for adapting to slot mis-sizing than does the prior art. For example, as shown in FIG. 8 a conventional slot properly sized for a locking key is illustrated. However, if the manufacturing process is not ideally controlled, a slot as shown in FIG. 10 could be created. A typical interference fit prior art key will generally be unable to retain itself or permit proper installation in a slot so mis-sized. On the otherhand, a key having the spring-retention mechanism of the present invention can adapt to the mis-sizing by virtue of the flexure area in the tang portion. This in turn relates to the reduced friction which when a mis-sized slot is encountered will still permit the key of the present invention to be properly driven into the carrier material.

Figure 11:
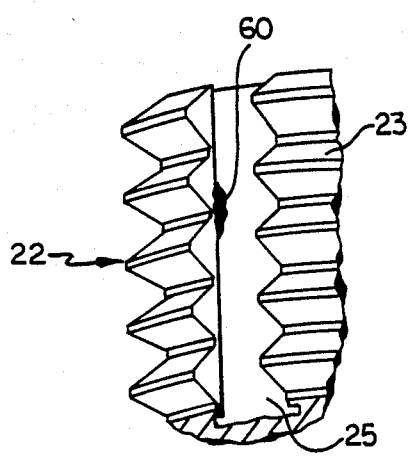
FIG. 11 is a view in perspective of an insert key slot having an obstruction in the path of the locking key.
Figure 12:
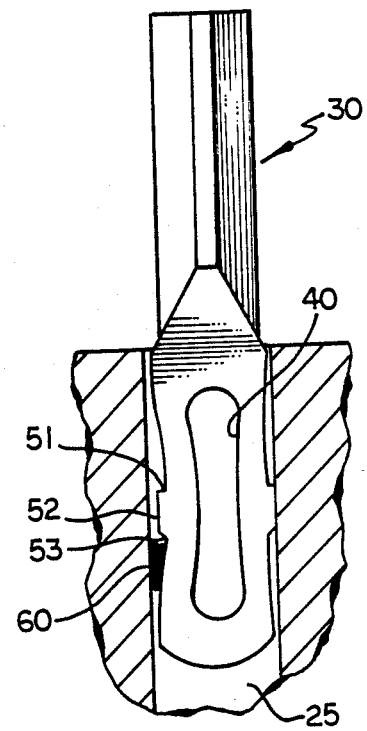
FIG. 12 is a plan view of a locking key as shown partially installed in the insert shown in FIG. 11.

Another advantage which the present invention provides over the known prior art is its adaptability with respect to obstructions which may be encountered in the insert slot 25 (see FIG. 11). Typically any obstruction e.g. a burr, 60 in the key slot will prevent a prior art key from being reliably and properly installed in the insert. With the present invention the flexure area on the tang portion may accommodate the obstruction and permit a final proper installation of the key. FIG. 12 illustrates the use of the present invention in the slot shown in FIG. 11.

It should now be appreciated that the present invention provides a uniquely constructed key tang portion which is more reliable and versatile than all the known prior art. Of course, modifications to the particular configuration of the opening 40, as well as, the protrusions 50 other than the preferred embodiment are certainly possible to one skilled in the art given the teachings described above. Accordingly, the scope of protection afforded to this invention is limited solely by the claims which follow.

What is claimed is:

1. A locking key for use with an insert installed in a threaded opening in a carrier material, said key having an upper locking portion and a lower tang portion, the insert having a cylindrical body portion, an exterior thread on said body complementary to and for engagement with the thread of the opening, and a slot in the body portion longitudinally interrupting the insert exterior thread, said key being constructed for positioning in the slot for installation therein, wherein the improvement comprises:

said locking key tang portion having a centrally-located aperture defining a flexure area and further having a pair of protrusions located in opposing relation along said aperture, for retaining said key in the insert slot.

2. The locking key of claim 1 wherein said protrusions are centrally located along said flexure area.

3. The locking key of claim 1 wherein said protrusions each include a leading surface constructed for guiding said key into and along the insert slot.

4. The locking key of claim 1 wherein said aperture is substantially rectangular-shaped.

5. A locking key for use with an insert installed in a threaded opening in a carrier material, said key having an upper locking portion and a lower tang portion, the insert having a cylindrical body portion, an exterior thread on said body complementary to and for engagement with the thread of the opening, and a slot in the body portion longitudinally interrupting the insert exterior thread, said key being constructed for positioning in the slot for installation therein, wherein the improvement comprises:

said locking key tang portion having spring retention means for retaining said key in the insert slot;

said spring retention means including an aperture that defines a flexure area centrally located on said tang portion and a pair of protrusions centrally located in opposing relation along said flexure area, said protrusions each including a leading surface constructed for guiding said key into and along the insert slot.

6. A combination comprising:

an insert having an externally-threaded cylindrical body portion adapted to be threaded into a threaded opening in a carrier material, said body portion having a longitudinally-extending slot in its outer, threaded surface, said slot having undercut sidewalls; and an elongated locking key having an upper locking portion and a lower tang portion, wherein the lower tang portion has a width greater than the width of the insert slot, and includes means for providing resilient inward flexing of said tang portion of greater width, to allow the lower tang portion to side axially within the slot, without deforming the slot, and to allow the locking key to be frictionally held in a selected axial location.

7. The combination of claim 6 wherein the lower tang portion of the locking key includes a flexure area and a pair of protrusions located in opposing relation along said flexure area.

8. The locking key of claim 7 wherein said protrusions are centrally located along said flexure area.

9. The locking key of claim 7 wherein said protrusions each include a leading surface constructed for guiding said key into and along the insert slot.

10. The locking key of claim 7 wherein said flexure area is centrally located on said tang portion and includes an aperture therein.

11. The combination of claim 10 wherein said aperture is elongated in the axial direction.

* * * * *